(12) United States Patent
Young et al.

(10) Patent No.: US 6,315,515 B1
(45) Date of Patent: *Nov. 13, 2001

(54) OVER-CENTER TOWING LOCKING MECHANISM FOR TOW TRUCK WHEEL LIFT OR THE LIKE

(75) Inventors: Charles E. Young, High Point, NC (US); Scott A. Watson, Falling Waters, WV (US)

(73) Assignee: Jerr-Dan Corporation, Greencastle, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/908,790

(22) Filed: Aug. 8, 1997

Related U.S. Application Data

(63) Continuation-in-part of application No. 08/554,826, filed on Nov. 7, 1995, now Pat. No. 5,722,810.
(60) Provisional application No. 60/023,739, filed on Aug. 8, 1996.

(51) Int. Cl.[7] .................................................. B60P 3/12
(52) U.S. Cl. ........................ 414/563; 280/402; 414/427
(58) Field of Search .................................. 414/563, 426, 414/427, 428, 429, 430, 546, 555; 254/2 R; 280/402

(56) References Cited

U.S. PATENT DOCUMENTS

| | | | |
|---|---|---|---|
| 2,183,478 | 12/1939 | Holmes et al. | ...................... 212/141 |
| 2,436,000 | 2/1948 | Fleming . | |
| 2,449,146 | 9/1948 | Ryan . | |
| 2,495,493 | 1/1950 | Wright | ............................... 280/32.44 |

(List continued on next page.)

FOREIGN PATENT DOCUMENTS 2238290A    5/1995   (GB) .

OTHER PUBLICATIONS

Abstract of Canadian Patent No. 2069809–A, Issued May 28, 1992, "Wheel Engaging System For Towing Vehicle Wheel Lifts", Derwent Publications Ltd. London, England 1993.

* cited by examiner

Primary Examiner—Frank E. Werner
(74) Attorney, Agent, or Firm—McDermott, Will & Emery

(57) ABSTRACT

The present invention relates to a wheel grid assembly and vehicle towing apparatus. The wheel grid assembly includes a wheel boom and a pair of lift arms. Each lift arm consists of an extension arm segment and an engaging arm segment pivotally mounted to the extension arm segment. Each engaging arm segment consists of an actuating arm segment and a gripping arm segment extending in opposite directions from the pivot point. A pair of linear actuators rotate the engaging arm segments about their pivot points to engage the wheels of a vehicle to be towed. Each linear actuator is attached to a respective engaging arm segment through an over-center locking mechanism. The over-center locking mechanisms lock the engaging arm segments in wheel engaging positions without aid of force from the linear actuators. The present invention also relates to a position lock mechanism and a wheel grid self-centering device. Additionally, the present invention provides a wheel spacer for creating adjustability in the lift arms to accommodate variations in wheel size, and an automatic linear actuator control line retractor assembly. The wheel grid assembly of the present invention may be incorporated with an extensible main boom, and utilized with various configurations of tow vehicles.

24 Claims, 14 Drawing Sheets

U.S. PATENT DOCUMENTS

| | | | |
|---|---|---|---|
| 2,625,278 | 1/1953 | Sensenbaugh . | |
| 2,793,770 | 5/1957 | St. Denis . | |
| 2,988,329 | 6/1961 | Sanders | 254/2 |
| 3,038,621 | 6/1962 | Mitchell . | |
| 3,434,607 | 3/1969 | Nelson . | |
| 3,667,630 | 6/1972 | Scott . | |
| 3,667,631 | 6/1972 | Bishop . | |
| 3,951,280 | 4/1976 | Peck . | |
| 4,034,873 | 7/1977 | Haring . | |
| 4,176,999 | 12/1979 | Thorley | 414/540 |
| 4,186,938 | 2/1980 | Youngblood | 280/402 |
| 4,194,755 | 3/1980 | Youngblood | 280/402 |
| 4,384,817 | 5/1983 | Peterson | 414/563 |
| 4,392,771 | 7/1983 | Smalley | 414/545 |
| 4,407,623 | 10/1983 | Parks | 414/540 |
| 4,451,193 | 5/1984 | Cannon, Jr. et al. | 414/563 |
| 4,473,334 | 9/1984 | Brown | 414/563 |
| 4,487,544 | 12/1984 | Hubbard | 414/563 |
| 4,493,603 | 1/1985 | Williams et al. | 414/541 |
| 4,564,207 | 1/1986 | Russ et al. | 280/402 |
| 4,573,857 | 3/1986 | Porter, Sr. et al. | 414/563 |
| 4,583,466 | 4/1986 | Reddy et al. | 105/447 |
| 4,632,629 | 12/1986 | Kooima | 414/563 |
| 4,634,337 | 1/1987 | Hamman | 414/563 |
| 4,640,660 | 2/1987 | Watson | 414/563 |
| 4,674,943 | 6/1987 | Nespor | 414/563 |
| 4,678,392 | 7/1987 | Capers et al. | 414/563 |
| 4,679,978 | 7/1987 | Holmes et al. | 414/563 |
| 4,701,099 | 10/1987 | Müller | 414/563 |
| 4,737,066 | 4/1988 | Allison, Jr. | 414/563 |
| 4,741,661 | 5/1988 | Carey | 414/563 |
| 4,761,110 | 8/1988 | Boutilier | 414/563 |
| 4,761,111 | 8/1988 | Brown | 414/563 |
| 4,775,285 | 10/1988 | Zackovich | 414/563 |
| 4,793,763 | 12/1988 | Bubik | 414/563 |
| 4,797,057 | 1/1989 | Shoup et al. | 414/563 |
| 4,797,058 | 1/1989 | Bilas | 414/563 |
| 4,798,509 | 1/1989 | Bubik | 414/563 |
| 4,815,915 | 3/1989 | Crupi, Jr. | 414/563 |
| 4,836,737 | 6/1989 | Holmes et al. | 414/563 |
| 4,838,753 | 6/1989 | Gehman et al. | 414/563 |
| 4,859,134 | 8/1989 | Lock | 414/563 |
| 4,861,221 | 8/1989 | Krisa | 414/563 |
| 4,871,291 | 10/1989 | Moore et al. | 414/563 |
| 4,874,285 | 10/1989 | Bubik | 414/563 |
| 4,904,146 | 2/1990 | Lock et al. | 414/563 |
| 4,917,563 | 4/1990 | Pollner et al. | 414/428 |
| 4,927,315 | 5/1990 | Nespor | 414/563 |
| 4,946,182 | 8/1990 | Weber | 280/402 |
| 4,948,327 | 8/1990 | Crupi, Jr. | 414/563 |
| 4,968,052 | 11/1990 | Alm et al. | 280/402 |
| 4,968,208 | 11/1990 | Friberg | 414/256 |
| 4,993,909 | 2/1991 | Hamman | 414/563 |
| 5,013,205 | 5/1991 | Schardt | 414/429 |
| 5,013,209 | 5/1991 | DeMichele et al. | 414/563 |
| 5,249,909 | 10/1993 | Roberts et al. | 414/476 |
| 5,259,572 | 11/1993 | Franken et al. | 244/50 |
| 5,269,553 | 12/1993 | Alonso | 280/402 |
| 5,302,074 | 4/1994 | Elfström | 414/427 |
| 5,326,216 | 7/1994 | Russ | 414/563 |
| 5,336,037 | 8/1994 | Cürten et al. | 414/429 |
| 5,350,271 | 9/1994 | Weller | 414/563 |
| 5,352,083 | 10/1994 | Roberts et al. | 414/477 |
| 5,354,167 | 10/1994 | Cullum et al. | 414/563 |
| 5,391,044 | 2/1995 | Young | 414/563 |
| 5,518,260 | 5/1996 | Grignon | 280/402 |
| 5,722,810 * | 3/1998 | Young et al. | 280/402 X |

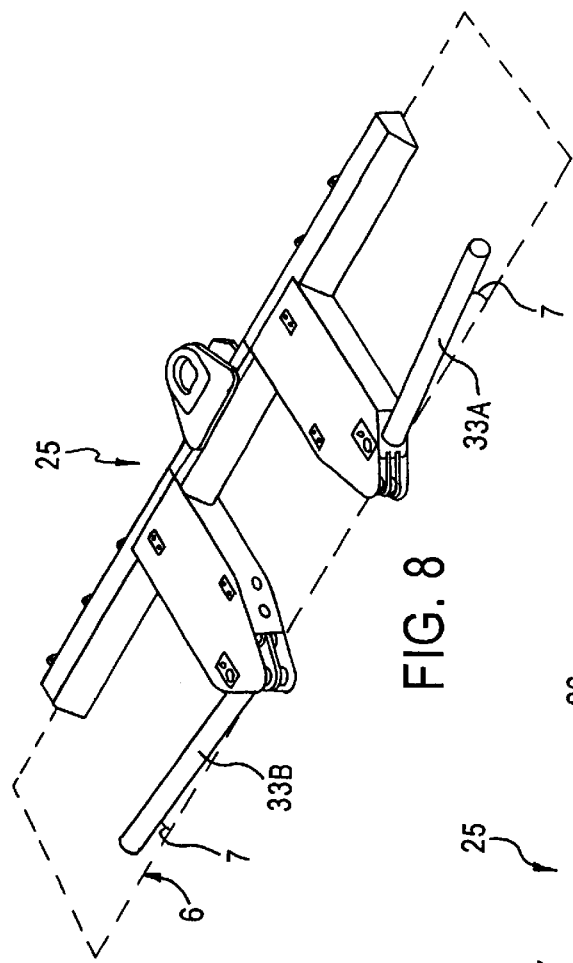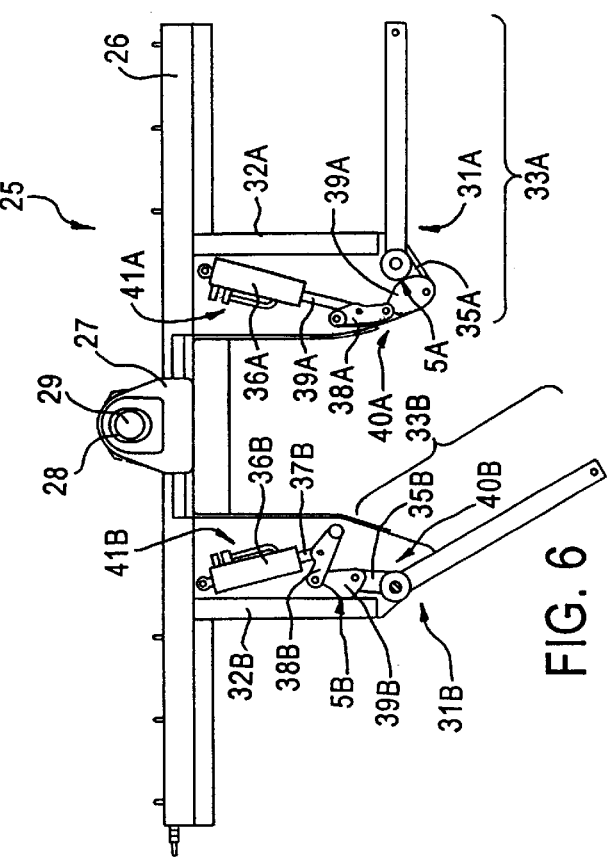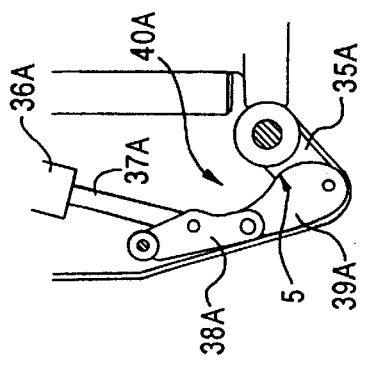

OVER-CENTER TOWING LOCKING MECHANISM FOR TOW TRUCK WHEEL LIFT OR THE LIKE

This application is based on United States Provisional Application Ser. No. 60/023,739, filed on Aug. 8, 1996 which is a Continuation-in-Part of U.S. Pat. No. 5,722,810, application Ser. No. 08/554,826, filed Nov. 7, 1995.

BACKGROUND OF THE INVENTION

The present invention relates to tow trucks, for towing a disabled automobile, and more particularly to a tow assembly for tow trucks which engage and lift the two front wheels or the two rear wheels of an automobile.

Tow trucks, for towing disabled automobiles by lifting either the front or rear wheels off the ground, and towing the partially-lifted automobile on its remaining two wheels, have long been used. The more modern and readily used types of tow trucks are known as a "wheel-lift" tow trucks. A wheel lift tow truck engages and lifts the vehicle to be towed at either its front or rear wheels (tires).

Wheel-lift tow trucks generally employ a telescoping or folding main boom element attached to the rear of the truck and extending rearwardly from or out beyond the truck's rear deck (the space between the rear of the cab and the rear bumper). The boom or crane element represents the main lifting or leverage component for lifting one end of the vehicle to be towed. Such tow trucks also utilize a wheel engaging apparatus, hereinafter referred to as the wheel grid, for engaging and holding the front or rear wheels of a vehicle. The wheel grid typically consists of a cross arm or wheel boom pivotally attached to the end of the main boom, and wheel retainers or lifting arms for engaging the wheels of the vehicle to be towed. When positioning the system for towing, the wheel boom is maneuvered into a position against the tread of the tires and the lifting arms are then locked into a position securing the tires in place against the wheel boom.

Examples of such a wheel-lift tow truck include: Youngblood, U.S. Pat. Nos. 4,186,938 and 4,194,755; LoCodo, U.S. Pat. No. 4,264,262; Lind, U.S. Pat. No. 4,473,237; Brown, U.S. Pat. No. 4,473,334; Russ, U.S. Pat. No. 4,564,207; Capers et al., U.S. Pat. No. 4,678,392; Muller, U.S. Pat. No. 4,701,099; Carey, U.S. Pat. No. 4,741,661; Brown, U.S. Pat. No. 4,761,111; Shoup et al., U.S. Pat. No. 4,797,057; Nespor, U.S. Pat. No. 4,927,315; Schardt, U.S. Pat. No. 5,013,205; DeMichele et al., U.S. Pat. No. 5,013,209; Franken et al., U.S. Pat. No. 5,259,572; Elfstrom, U.S. Pat. No. 5,302,074; Russ, U.S. Pat. No. 5,326,216; Curten, U.S. Pat. No. 5,336,037, Weller, U.S. Pat. No. 5,350,271; Wern, Canadian Patent No. CA 2069809-A; and Jones, UK Pat. App. GB 2 238 290 A.

Wheel-lift tow trucks were introduced to minimize the potential for damage caused by crane and hook or sling type tow vehicles. These early model tow trucks became ineffective at safely and reliably towing newer model automobiles due to lower chassis heights, new bumper designs and air-dams. Various of the above mentioned prior art references, however, still exhibited limitations such as inability to utilize the truck's rear deck, potential damage to the automobile by engagement with the wheel grid and/or the main boom (this is more prevalent with vehicle designs exhibiting a substantial overhang of the body or chassis beyond the front and/or rear axle), lack of sufficient maneuverability of the main and wheel booms for tow positioning, and tipping of the tow truck due to the weight of the vehicle in tow. Shoup et al., U.S. Pat. No. 4,797,057, provides a wheel lift type tow truck, having an extensible main boom and a motor and linkage for raising and lowering the main boom, which fully addresses these limitations, and is incorporated by reference herein.

The prior art also lacks efficient safety or locking mechanisms for securing the towed vehicle within the wheel grid. With the hydraulic actuator configuration of Capers, supra, for example, a loss of hydraulic power would release the wheel supports (lift arms in the present invention) and enable the vehicle in tow to disengage from the lateral extension assembly (wheel grid in the present invention), and drop from the tow vehicle. The employment of a safety locking mechanism would be essential to guard against this dangerous potential.

Some references employ various types of locking mechanisms which, however, fail to achieve the advantages of the present invention. Carey, supra, discloses a manually operable latch means with a spring biased, slidable latch bolt which when in a locked position engages a notch in an adjacent pivot plate and thereby locks the wheel restraint assembly. Additionally, Nespor, supra, employs a pin lock which utilizes a pin inserted through a hole in a shoe at the end of the cross bar (wheel boom) which engages one of several notches in the tire retaining member (lift arm) and thereby locks the retaining member in place around the tire. Such locking mechanisms, however, unlike the present invention, require manual engagement, adding extra steps to the towing procedure and introducing additional human error into the safety of the towing process.

The present invention overcomes these limitations by providing an over-center locking mechanism which automatically secures the wheel engaging arms of the wheel grid in place without the assistance of the actuating mechanisms (hydraulic cylinders, screw drives, or the like). This over-center locking mechanism requires no manual engagement or extra steps beyond the normal procedure for engaging, lifting and towing the target automobile. Engagement of the lift arms and wheel boom with the wheels of the vehicle to be towed automatically sets the overcenter locking mechanism without the continued support of the linear actuators. The present invention further provides a reverse tilt lock or position lock which may serve as either a back-up or primary security system. The position lock, like the over-center lock, is automatic and requires no manual engagement.

The present invention further provides a wheel spacer which adapts the wheel boom for smaller sized wheels and flat tires. The wheel spacer adjusts the space between the parts of the wheel grid which engage the wheel of the vehicle to be towed. This wheel spacer engages wheels of varying sizes more efficiently than wheel grids disclosed in the prior art. The wheel spacer also positions the wheels of the vehicle in tow in a manner producing maximum ground clearance and maximum clearance between the underside of the vehicle in tow and the wheel grid itself. These increased clearances reduce the risk of damage to the vehicle during the towing process.

BRIEF SUMMARY OF THE INVENTION

The tow truck of the present invention includes a truck chassis with a bed frame made up of spaced frame members, and a deck assembly situated upon the bed frame. Attached to the end of a main boom is a wheel grid assembly for engaging either the front or rear wheels of the vehicle to be towed. The wheel grid assembly of the present invention includes a wheel boom pivotally connected to the outer end of the main boom, and inclined surfaces at each end of the wheel boom for engagement with an automobile wheel. A pair of lift arms extend rearwardly from the wheel boom, and generally perpendicular thereto. Each lift arm is comprised of an extension arm segment and an engaging arm segment which is pivotally connected to the end of the extension arm segment, remote from the wheel boom. The wheel boom and the extension arm segments are situated in a plane, and the engaging arm segments are positioned at upward angles with respect to that plane. The upward angles prevent the engaging arm segments from contacting the ground while pivoting from the open position to the closed or wheel engaging position during the loading of the vehicle to be towed.

Linear actuators, such as hydraulic cylinders, are provided for moving the engaging arm segments into a wheel engaging position for lifting an end of the vehicle to be towed. Each linear actuator connects to an over-center locking mechanism for locking the engaging arm segment in a wheel-engaging position, and thereby locking the engaging arm segment without aid of force from the linear actuator.

The over-center locking mechanism consists of a linkage apparatus whereby full extension of the linear actuator positions the linkage apparatus in a locking position, such that outward pressure by the wheel against the engaging arm segment forces said linkage apparatus in the direction of the locking position. The linear actuator specifically connects to an actuating link having one end pivotally attached to the lift arm's extension arm segment and the other end pivotally attached to one end of a connecting link. The other end of the connecting link is then pivotally attached to the lift arm's engaging arm segment. The linkage is configured such that full extension of the linear actuator positions the pivot point between the actuating link and the connecting link beyond 180 degrees (over-center) so that outward pressure by the wheel against the engaging arm segment forces the linkage apparatus in the direction of the locking position. Additionally, the connecting link is shaped such that in includes a lobe which prevents the over-center locking mechanism from entering an over-center locking condition when the engaging arm segment is in an open position.

The present invention further provides an automatic linear actuator control line retractor assembly and a wheel grid self-centering device. The control line retractor assembly is attached to the telescopic main boom and automatically draws in the linear actuator control lines during retraction of the main boom. The control line retractor assembly consists of a pulley, a connecting cable and a spring loaded dispensing reel which enables automatic retraction of the linear actuator control lines during retraction of the telescopic main boom. The wheel grid self-centering device consists of a spring mechanism which places tension on the wheel boom which forces the wheel grid towards a transverse position with respect to the main boom.

The present invention further provides a position lock mechanism with a switch such that when the wheel grid is in a raised or towing position the switch is in a non-depressed or open position preventing actuation of the linear actuators. Consequently, with the main boom a raised or towing position, the lack of power to the linear actuators locks the engaging arm segments in a closed or wheel-engaging position. When the main boom is lowered to a loading position, the switch is depressed or closed which permits the flow of power to the linear actuators.

Additionally, the present invention includes a wheel spacer with a wheel engaging surface and pins for attaching the wheel spacer to the wheel grid. The wheel spacer also includes a spring loaded latching pin, extending through the right and left edges of the wheel spacer and a gripping means at one end. A spring located just inside the edge of the wheel spacer forces the latching pin through a hole in the extension arm segment and latching the wheel spacer in place. The wheel spacer adjusts the size of the lift arm to accommodate variations in wheel size and flat tires.

The present invention provides advantages over the prior art by using an over-center locking mechanism which automatically locks the wheels, of a vehicle in tow, within the lift arms of the wheel grid without the aid of force from the linear actuators. The invention thereby provides a safety mechanism which, in the event of a failure of the linear actuators, the vehicle in tow will remain locked in place on the wheel grid. The present invention further improves over the prior art by teaching an alternative position locking mechanism, which may be employed as either a primary lock, or as a secondary safety system in addition to the over-center locking mechanism. Additionally, the present invention discloses a wheel spacer which improves over the prior art by adding adjustability to accommodate wheels of varying sizes, including flat tires, and maximizes ground clearance, and the clearance between the vehicle and the wheel grid which, reduces the risk of damage to the vehicle in tow.

BRIEF DESCRIPTION OF THE DRAWINGS

FIG. 6 is a top view of a preferred embodiment of a wheel grid in accordance with the present invention.

FIG. 7 is a detailed top cut-away view of the over-center locking mechanism of the present invention, depicted in its locked position.

FIG. 8 is an isometric view of FIG. 5, depicted with a top plate covering the over-center locking mechanism within the extension arm segment of a lifting arm.

DESCRIPTION OF THE PREFERRED EMBODIMENTS

Figure 1:
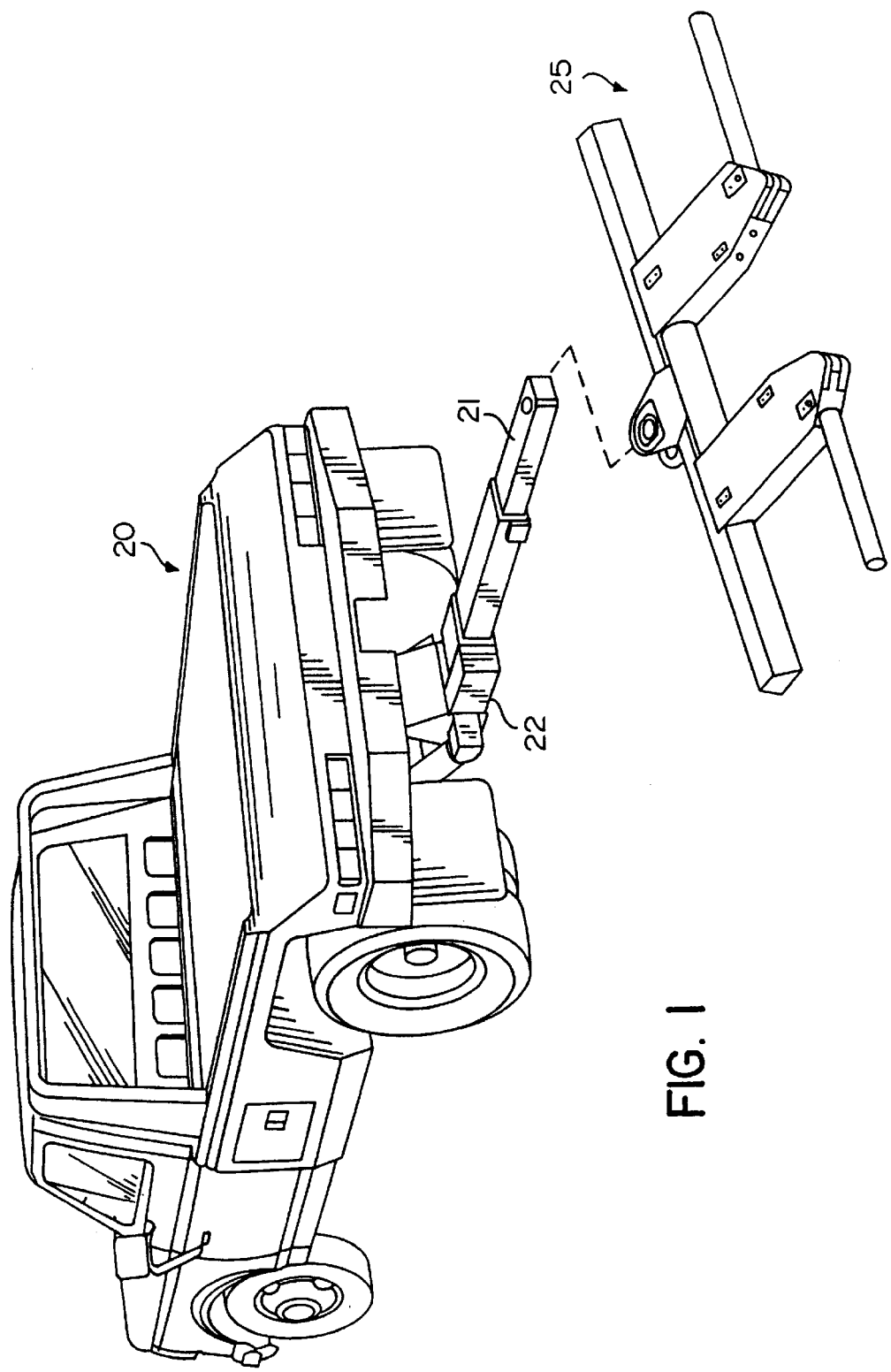
FIG. 1 is an isometric view of a tow truck incorporating the wheel grid of the present invention.
Figure 2:
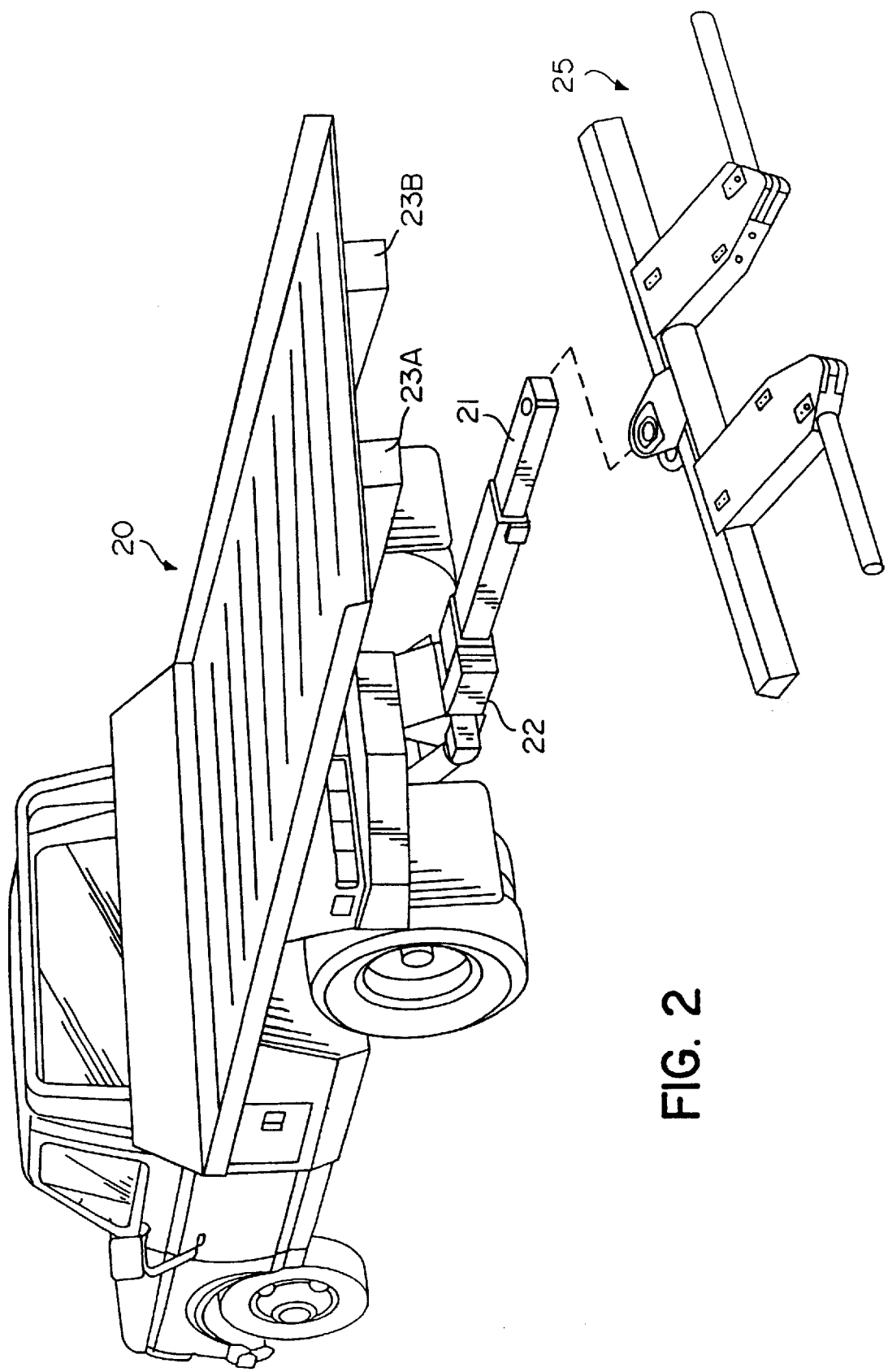
FIG. 2 is an isometric view of a car carrier in accordance with the present invention and incorporating the wheel grid of the present invention.
Figure 3:
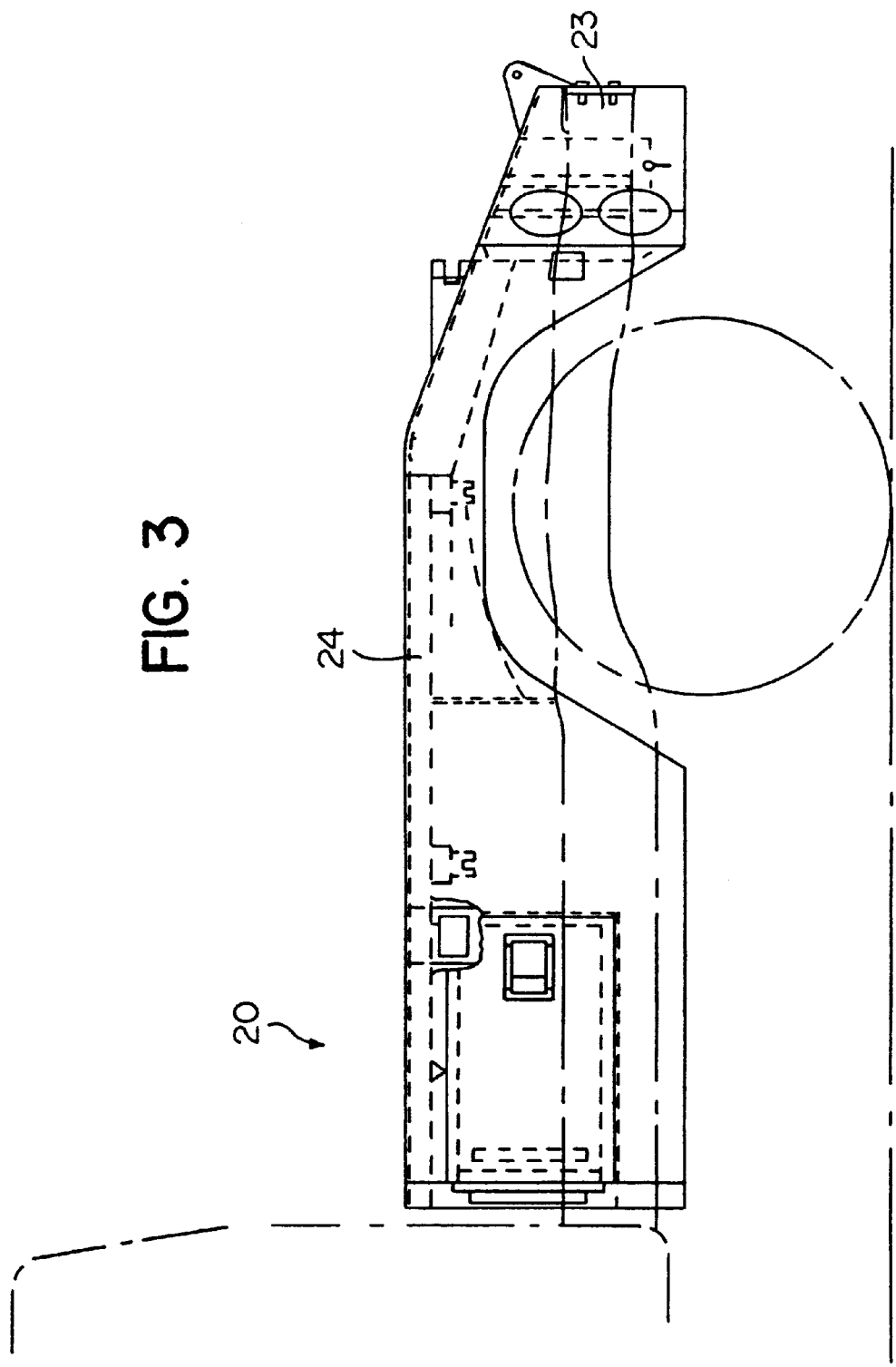
FIG. 3 is a detailed partial side view of a tow truck chassis.
Figure 4:
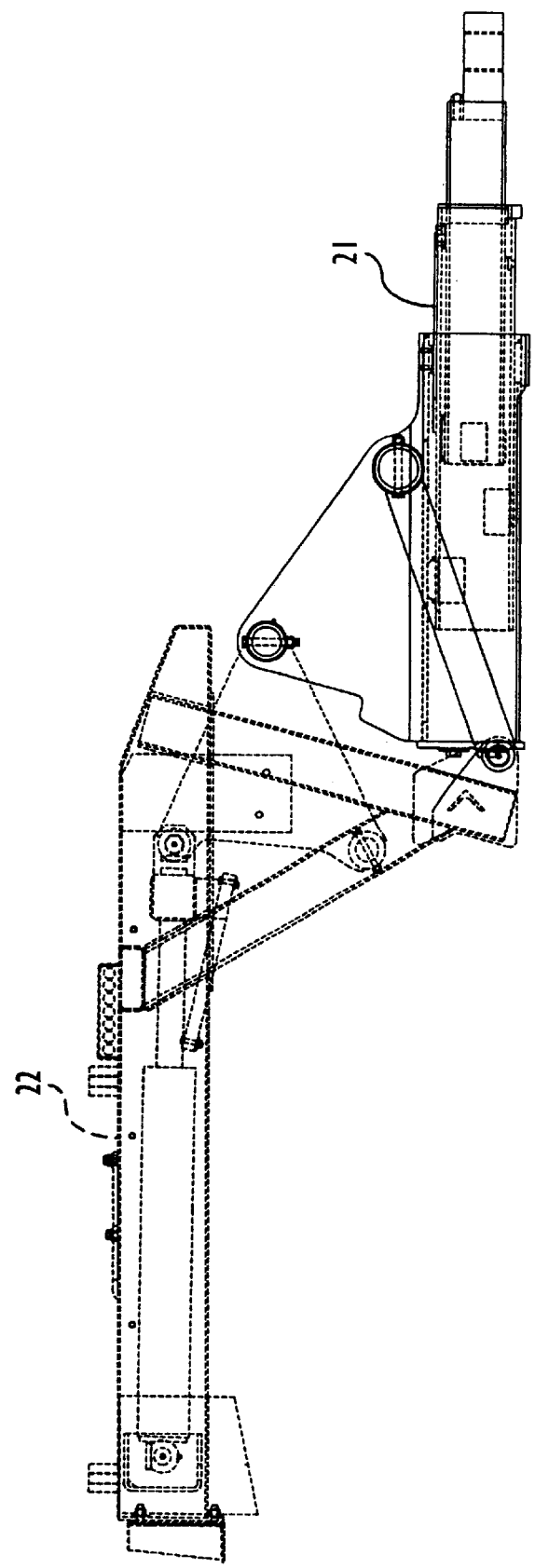
FIG. 4 is a detailed side view of a tow assembly for attachment to a tow truck attached to an extendible boom.
Figure 5:
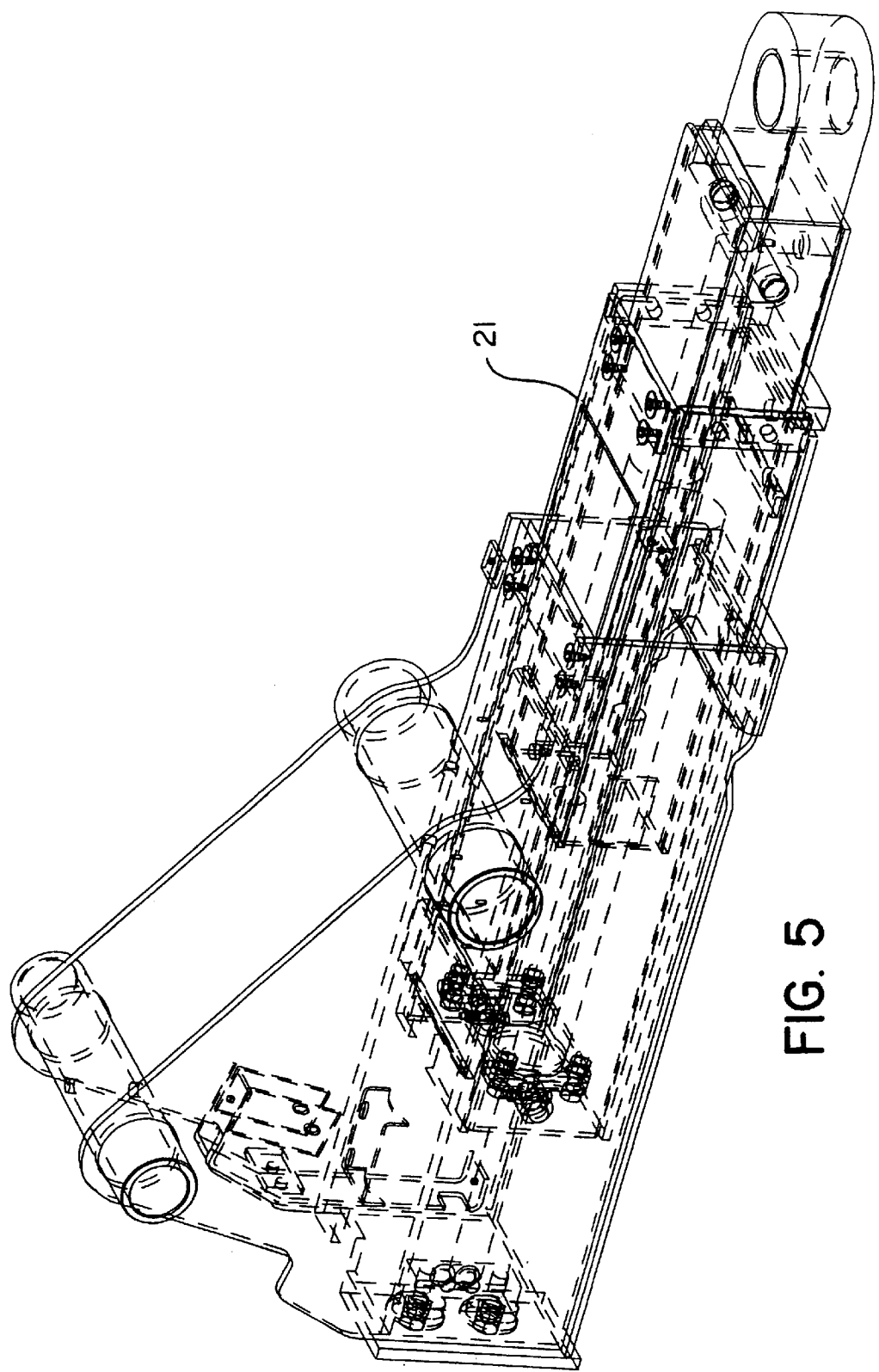
FIG. 5 is an isometric view of an extendible boom.

Referring now to the drawings, wherein like or corresponding reference numerals are used for like or corresponding parts throughout the several views, there is shown in FIGS. 1 and 2, a wheel-lift type of tow truck 20 having an extensible telescopic main boom 21 and a tow assembly 22, including a motor and linkage, for raising and lowering the main boom 21. The tow truck 20 of the present invention includes a truck chassis, shown in FIG. 3, with a bed frame 23 made up of spaced frame members 23A and 23B, and a deck assembly 24 situated upon the bed frame 23. The tow assembly 22 is shown in FIG. 4 attached to the main boom 21. FIG. 5 shows the main boom 21. Attached to the end of the main boom 21 is a wheel grid assembly 25 for engaging either the front or rear wheels of the vehicle to be towed.

Referring now to FIG. 6, there is shown a wheel grid assembly 25 in accordance with the present invention. In this first embodiment the wheel grid assembly 25 includes the wheel boom 26 having, at the center thereof, a forwardly extending mount bracket 27 in the center of which there is the bearing 28; a pin 29, serves to pivotally connect the wheel boom 26 to the bearing 28, thereby pivotally connecting the wheel grid assembly 25 to the main boom 21 for movement through substantially 180 degrees.

The lift arms 31A and 31B each include extension arm segments 32A and 32B, extending rearwardly and relatively perpendicularly to the wheel boom 26. The engaging arm segments 33A and 33B are pivotally connected at the rear or outer ends, remote from the wheel boom 26, of the extension arm segments 32A and 32B. The engaging arm segments 33A and 33B consist of actuating arm segments 35A and 35D and gripping arm segments 34A and 34B extending in relatively opposite directions from the pivot point of the engaging arm segments 33A and 33B. The engaging arm segments 33A and 33B form pivoting arms that are pivotally connected to over-center locking mechanisms 40A and 40B at the ends of the actuating arm segments 35A and 35B.

The wheel boom 26 and the extension arm segments 32A and 32B are situated in a plane 6, as illustrated in FIG. 8. The engaging arm segments 33A and 33B are positioned at upward angles 7 with respect to the plane 6. The upward angles 7 prevent the engaging arm segments 33A and 33B from contacting the ground while pivoting from the open position to the closed or wheel engaging position during the loading of the vehicle to be towed. The upward angles 7 a approximately range from 1°–5°, and preferably approximately range from 2°–3°.

The engaging arm segments 33A and 33B are pivoted by actuation of the linear actuators 41A and 41B. The linear actuators 41A and 41B consist of fixed arm segments 36A and 36B and movable arm segments 37A and 37B. One end of each of the fixed arm segments 36A and 36B is pivotally attached to the extension arm segments 32A and 32B, respectively, and the movable arm segments 37A and 37B extend through the opposite ends of the fixed arm segments 36A and 36B. The end of each of the movable arm segments 37A and 37B, that extends out from the respective fixed arm segment 36A or 36B, is pivotally attached to the respective over-center locking mechanism 40A or 40B. The linear actuators 41A and 41B are powered such that extension of the movable arm segments 37A and 37B rotates the engaging arm segments 33A and 33B about their pivot points, from an open position (non-engaging position), illustrated by the left lift arm 31B of FIG. 6, to a closed position (wheel-engaging position), illustrated by the right lift arm 31A of FIG. 6.

The linear actuators 41A and 41B maneuver the lift arms 31A and 31B between the open and closed positions and automatically lock the lift arms 31A and 31B, when in the closed position, through the over-center locking mechanisms 40A and 40B. The over-center locking mechanisms 40A and 40B each consists of a linkage apparatus whereby full extension of a linear actuator's movable arm segment positions the linkage apparatus in a locking position, such that outward pressure by the wheel of a vehicle in tow against the engaging arm segment forces the linkage apparatus toward the locking position. The locked or wheel engaging position is therefore automatically maintained without the aid of the linear actuators 41A and 41B.

In this first embodiment, as illustrated in FIGS. 6 and 7, the linear actuators 41A and 41B specifically connect to actuating links 38A and 38B. One end of each actuating link 38A and 38B is pivotally attached to the respective extension arm segment 32A or 32B, and the other end is pivotally attached to one end of the respective connecting link 39A or 39B. The other end of each of the connecting links 39A and 39B is pivotally attached to the respective engaging arm segment 33A or 33B. The linkages are configured such that full extension of the linear actuators' movable arm segments 37A and 37B rotates the linkages to a position where the pivotal joint between the actuating links 38A and 38B and the connecting links 39A and 39B are situated at or beyond the 180 degree point (over-center). Consequently, outward pressure by the wheels of a vehicle in tow against the engaging arm segments 33A and 33B forces the linkages of the over-center locking mechanisms 40A and 40B toward their locked positions. The locked or wheel-engaging position is therefore automatically maintained without the aid of the linear actuators 41A and 41B.

Additionally, the connecting links 39A and 39B are shaped such that they include lobes 5A and 5B at the ends attached to the engaging arm segments 33A and 33B. The lobes 5A and 5B prevent the over-center locking mechanism from entering an over-center locking condition while the engaging arm segments 33A and 33B are in open positions. In other words, as illustrated by the left lift arm in FIG. 6, when the engaging arm segment 33B is in an open position, the lobe 5B comes in contact with the extension arm segment 32B and prevents the over-center locking mechanism 40B from achieving an over-center position. If the over-center locking mechanisms were permitted to achieve an over-center condition in the open position, such would undesirably lock the engaging arm segments 32A and 32B in the open position.

In the closed or engaging position, the over-center locking mechanisms 40A and 40B automatically obtain a locked position whereby release of the engaging arm segments 33A and 33B cannot occur without actuation of the linear actuators 41A and 41B. In other words, to release the engaged wheel of the vehicle in tow, the linear actuators 41A and 41B must be powered to retract the movable arm segments 37A and 37B which thereby unlocks the over-center locking mechanisms 40A and 40B and rotates the engaging arm segments 33A and 33B to the aforementioned open position.

Figure 9:
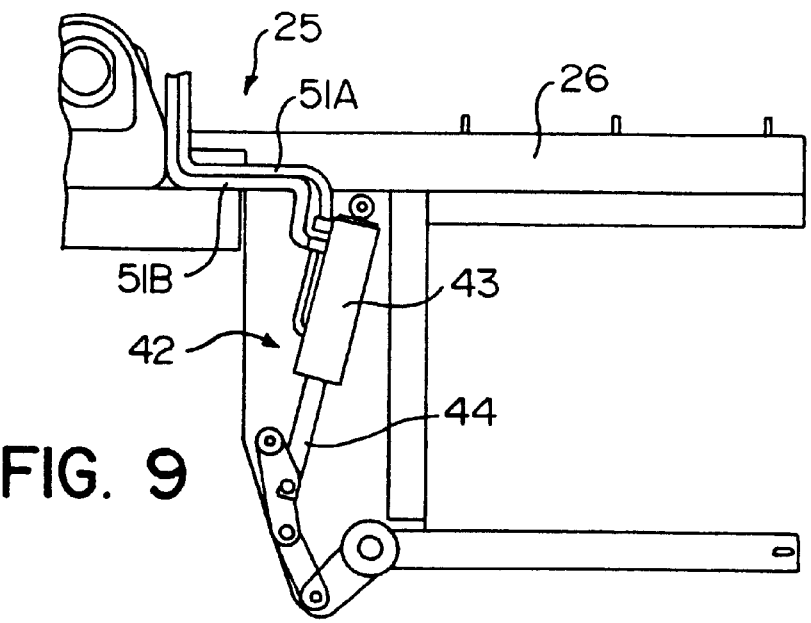
FIG. 9 is a detailed top cut-away view of the hydraulic cylinder linear actuator.

Variations of the above described embodiments are possible. For example, the linear actuators may consist of a number of different linear control devices. One configuration, as illustrated in FIG. 9, may employ a hydraulic cylinder 42 as the linear actuators 41A and 41B. Each hydraulic cylinder 42 would consist of a hydraulic bushing 43 (fixed arm segment) and a hydraulic piston 44 (movable arm segment). The hydraulic cylinder 42 operates from a pressurized hydraulic system commonly known to those skilled in the art. Hydraulic fluid within the hydraulic bushing 43 actuates the hydraulic piston 44 through variation of the hydraulic fluid pressure. The hydraulic fluid flows through linear actuator control lines 51A and 51B. The embodiment utilizing hydraulic cylinders 42 would be configured with respect to the entire wheel grid assembly 25 as described above.

Figure 10:
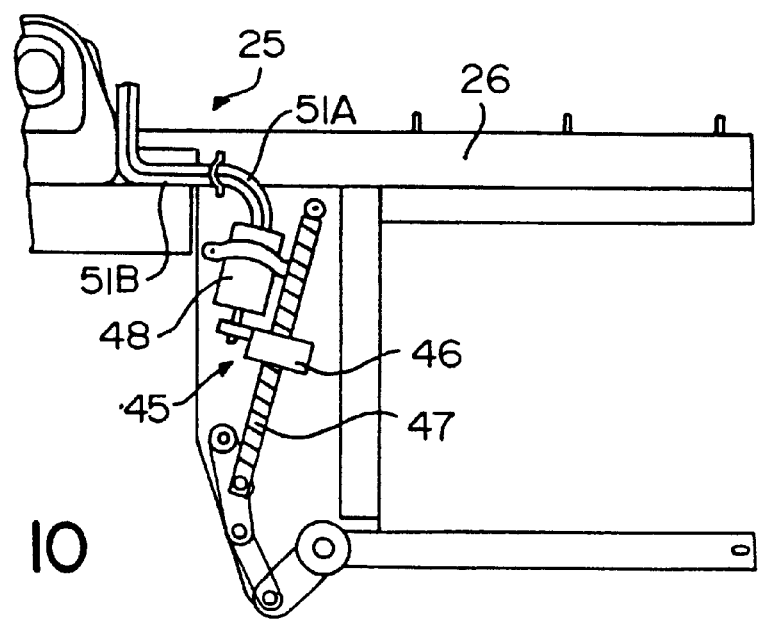
FIG. 10 is a detailed top cut-away view of the screw drive linear actuator.

In another variation of the present invention, as illustrated in FIG. 10, the linear actuators 41A and 41B each could consist of a linear screw drive 45. Each screw drive 45 would consist of a threaded bushing 46 (fixed arm segment) and a threaded shaft 47 (movable arm segment). The screw drive 45 employs an electric motor 48 for actuation by spinning the threaded bushing 46, which in turn either extends or retracts the threaded shaft 47 depending on the spin direction. The electric motor 48 is powered through linear actuator control lines 51A and 51B. The embodiment utilizing screw drives 45 would be configured with respect to the entire wheel grid assembly 25 as described above.

Figure 12:
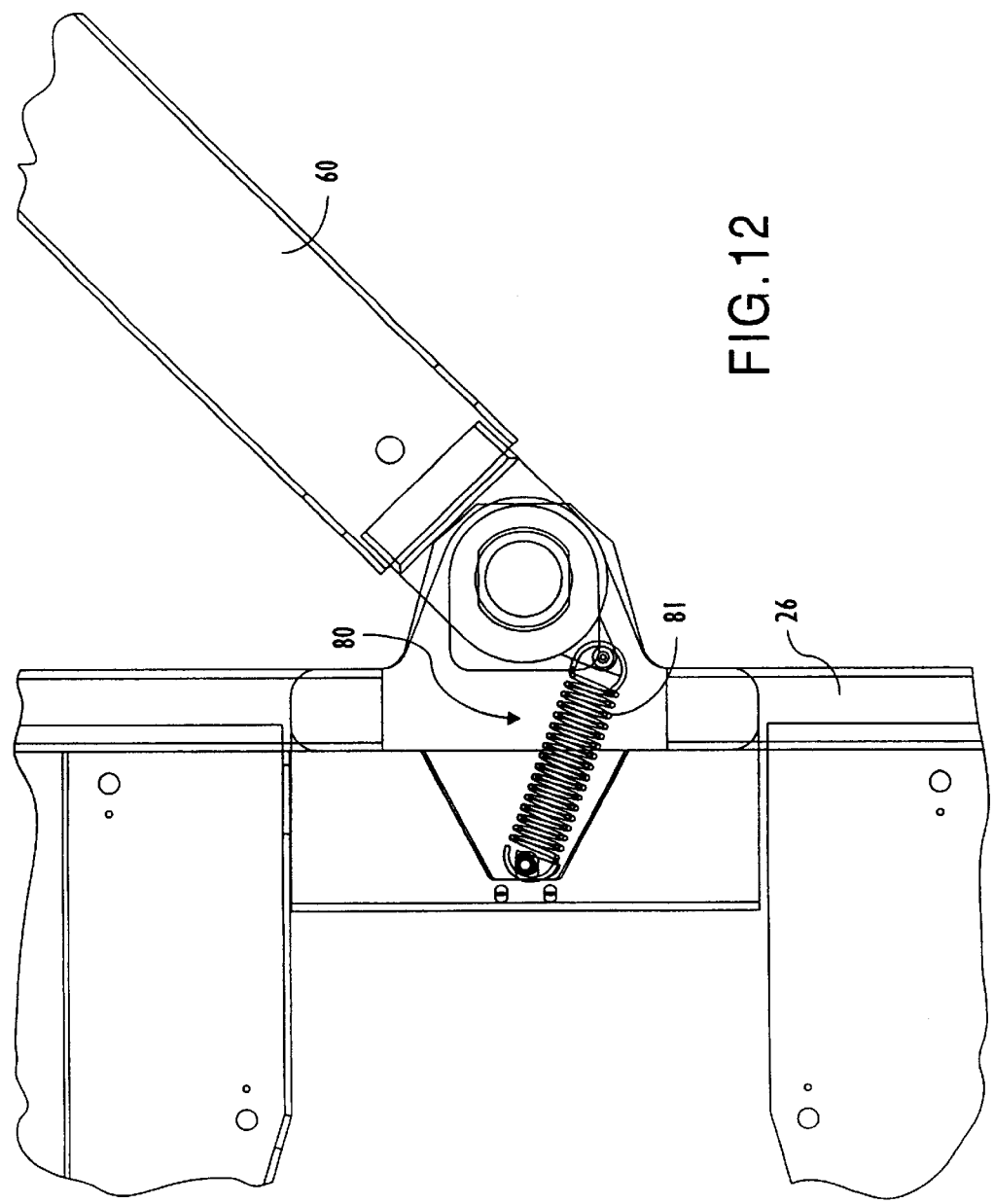
FIG. 12 is a top cut-away view of the wheel grid self-centering device.
Figure 13:
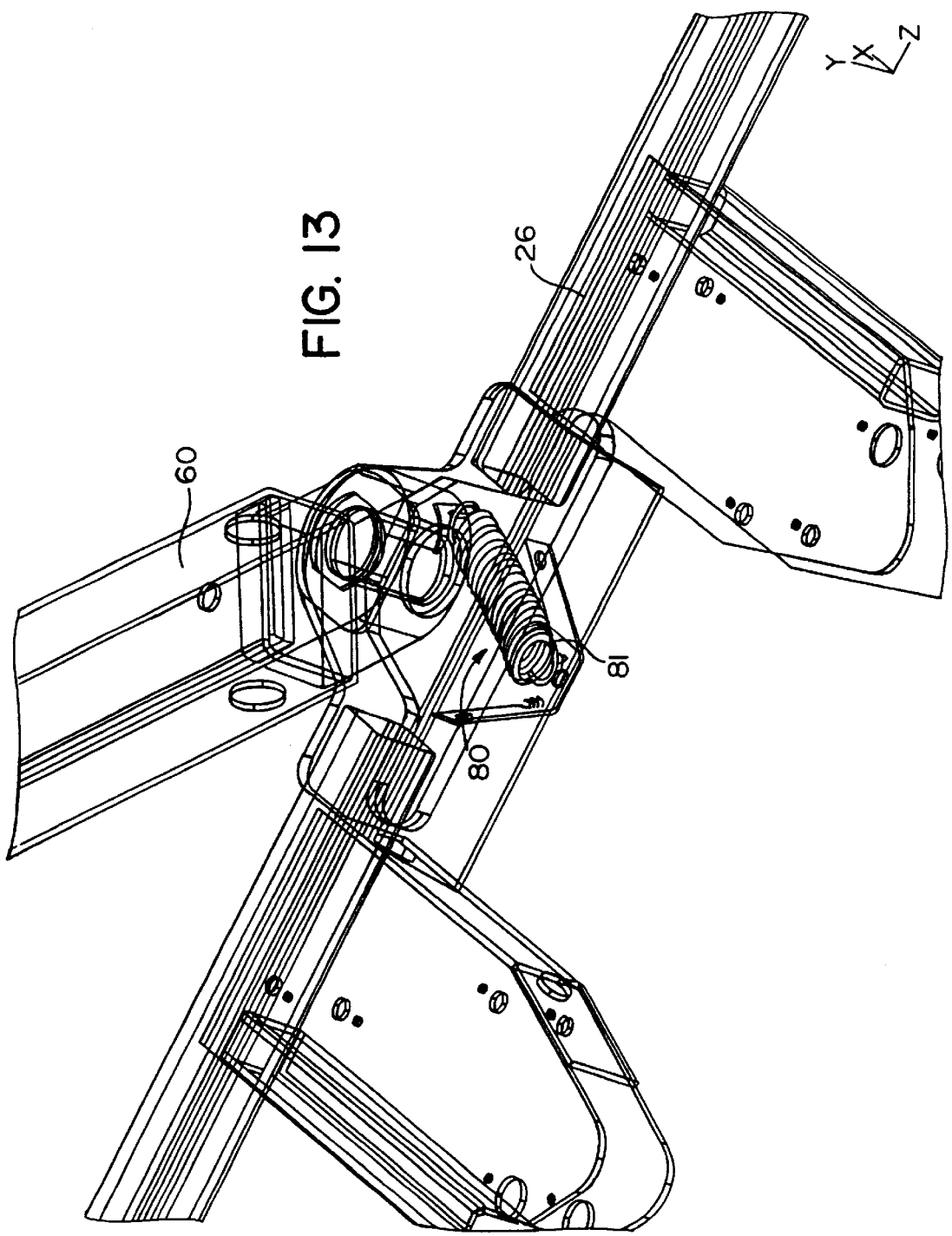
FIG. 13 is an isometric view of the wheel grid self-centering device.

Referring now to FIGS. 12 and 13, another variation of the present invention discloses a wheel grid self-centering mechanism 80. The wheel grid self-centering mechanism 80 consists of a spring 81 with one end attached to the telescoping end of the main boom 21, and the other end centrally attached to the wheel boom 26. Rotation of the wheel grid 25 stretches the spring 81 and creates a tension force drawing the wheel grid 25 towards its center or transverse position with respect to the main boom 21. The positioning of the wheel grid 25 will consequently be biased towards its center or transverse position with respect to the main boom 21.

Figure 11:
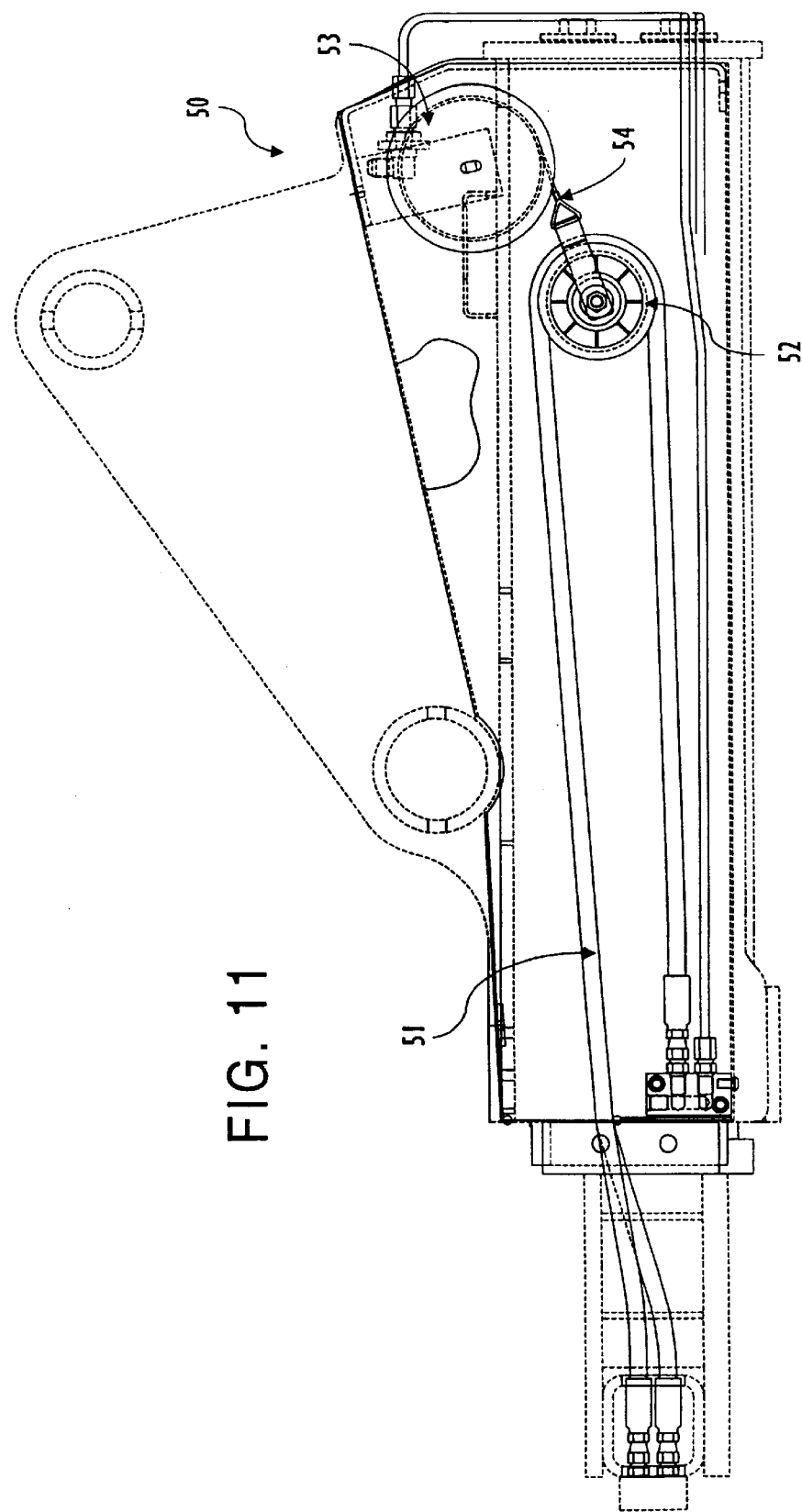
FIG. 11 is a detailed side view of the automatic linear actuator control line retractor assembly.

In yet, a further variation of the present invention, as illustrated in FIG. 11, an automatic linear actuator control line retractor assembly 50 is disclosed. This control line retractor assembly 50 attaches to the telescopic main boom 21, and automatically draws in the linear actuator control lines 51A and 51B. The control line retractor assembly 50 consists of a pulley 52 attached, via a connecting cable 54, to a spring loaded dispensing reel 53. The spring loaded dispensing reel 53 is in turn attached to the main boom 21. In operation, as the telescopic main boom 21 is extended the linear actuator control lines 51A and 51B drag the pulley 52 in the direction of the extension of the main boom 21, which in turn draws the connecting cable 54 out from the spring loaded dispensing reel 53. Then as the main boom 21 is retracted, the connecting cable 54 is reeled in through the recoil action of the spring loaded dispensing reel 53, which in turn draws the pulley 52 and the linear actuator control lines 51A and 51B back in the direction of the retracting main boom 21.

Figure 14:
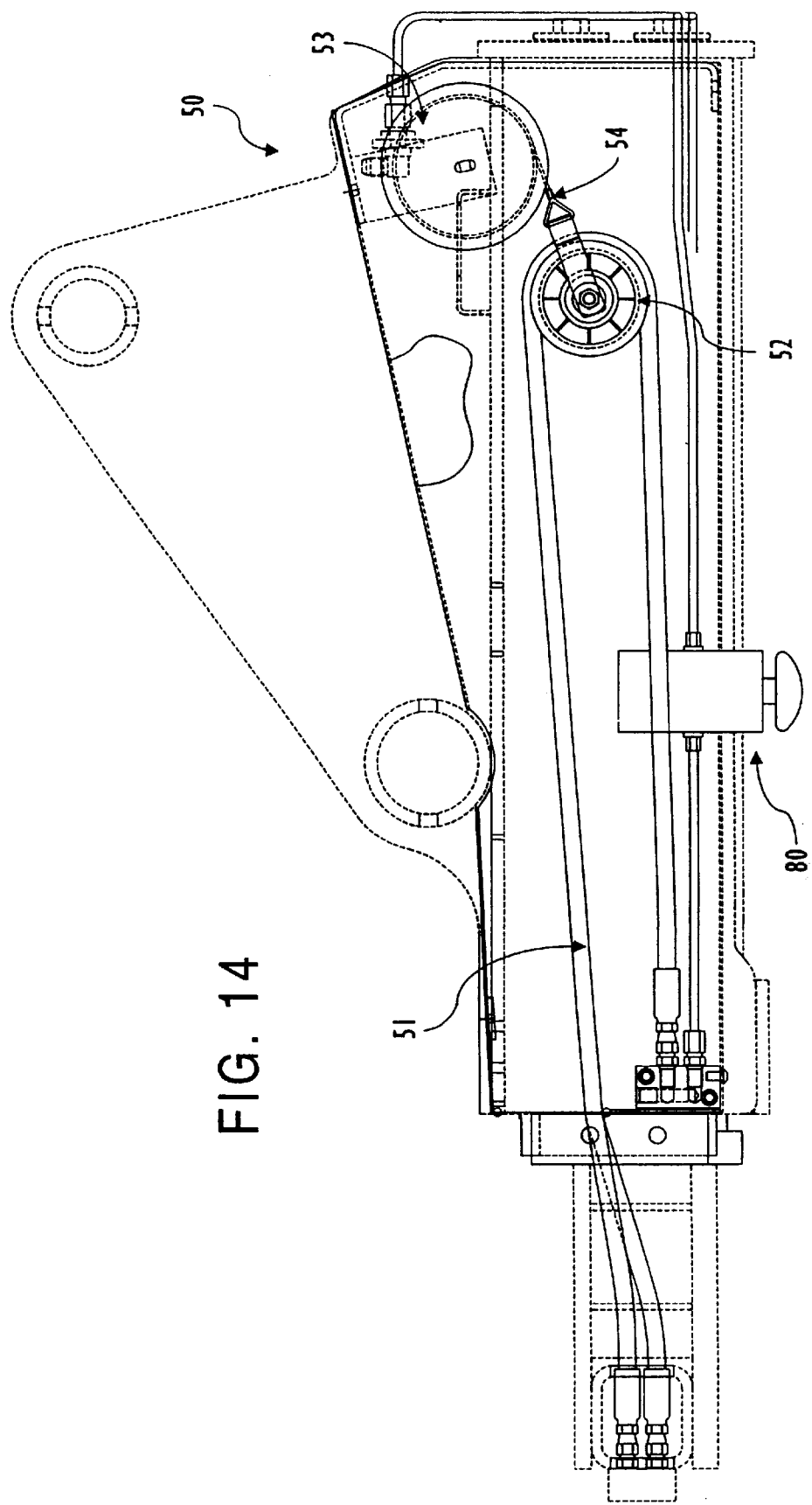
FIG. 14 is a detailed side view of the automatic linear actuator control line retractor assembly with the grid lock-out switch.
Figure 15:
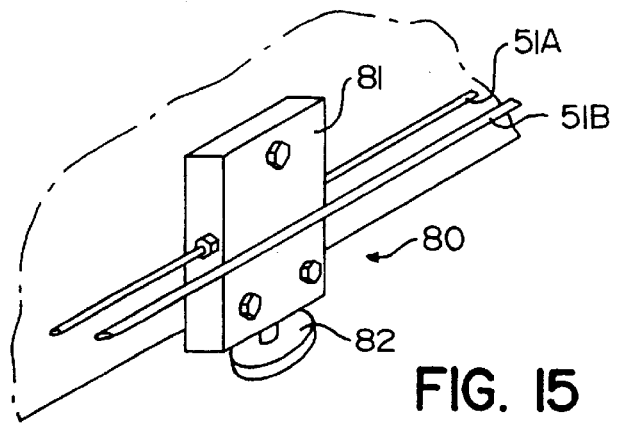
FIG. 15 is a detailed view of the grid lock-out switch.
Figure 16:
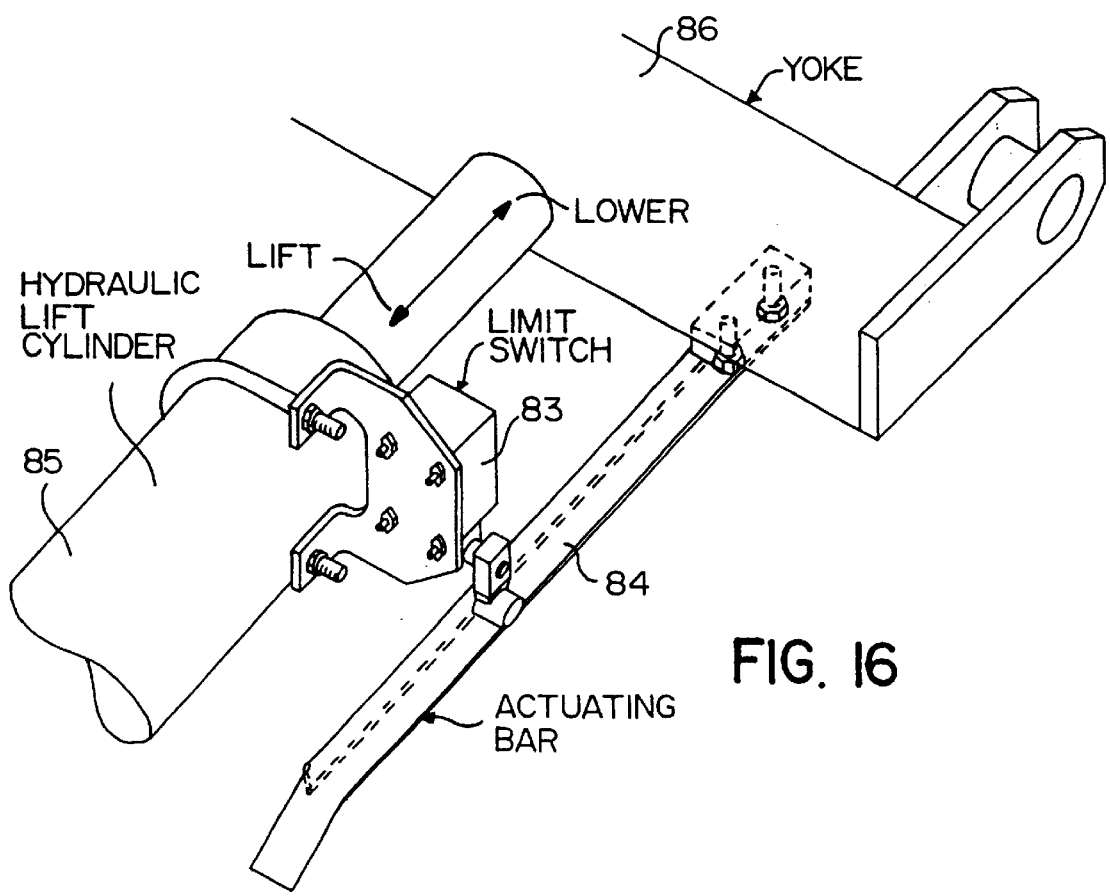
FIG. 16 is a detailed view of the limit switch and actuating bar.

In yet an additional variation, the present invention discloses a position lock mechanism 80, as illustrated in FIGS. 14, 15 and 16, whereby the engaging arm segments 33A and 33B are either locked or unlocked depending upon the position of the wheel grid assembly 25. This mechanism locks the engaging arm segment 33, in a locked or wheel-engaging position while the wheel grid assembly 25 is in a raised or lifting position. The position lock mechanism 80 may be employed as either the primary locking mechanism or as a back-up or secondary locking mechanism in addition to the over-center locking mechanism.

One embodiment of the position lock mechanism 80, as depicted in FIG. 15, consists of a grid lock-out switch 81 with an actuating button 82. The grid lock-out switch is located in one of the linear actuator control lines and regulates the actuation of the linear actuators 41A and 41B based on the position of the main boom 21. When the main boom 21 is in a raised or towing position, the grid lock-out button 82 is in a non-depressed or open position and power to the linear actuators 41A and 41B is cut-off. The grid lock-out switch may comprise a number of different configurations depending on the type of linear actuators 41A and 41B utilized. One configuration may consist of a mechanical valve wherein the open position obstructs the flow of hydraulic fluid to the hydraulic cylinder linear actuators 42A and 42B. Another configuration could consist of an electrical switch wherein the open position cuts off electrical power to the screw drive linear actuators 45A and 45B. Consequently, with the main boom 21 in this raised or towing position, the lack of power to the linear actuators 41A and 41B locks the engaging arm segments 33A and 33B in a locked or wheel-engaging position. When the main boom 21 is lowered to a loading position, contact with the ground depresses the actuating button 82 which permits the flow of power to the linear actuators 41A and 41B. The linear actuators 41A and 41B are then operable and the gripping arm segments 33A and 33B may be freely opened and closed as described above.

In an additional embodiment of the position lock mechanism 80, as depicted in FIG. 16, a limit switch 83 is attached to the hydraulic lift cylinder 85. The limit switch 83 is activated by an actuating bar 84 attached to the yoke 86. When the hydraulic lift cylinder 85 is retracted and the main boom 21 is in a raised or towing position, the actuating bar 84 releases the limit switch 83 to an open or non-depressed position which prevents actuation of the linear actuators 41A and 41B (i.e., in the case of hydraulic linear actuators, an open position of the limit switch prevents the control signals from reaching the hydraulic control valves, and in the case of screw drive linear actuators, the open position of the limit switch prevents the control signals from reaching the screw drives). Consequently, with the main boom 21 in a raised or towing position, the lack of power to the linear actuator controls prevents actuation of the linear actuators 41A and 41B and thereby locks the engaging arm segments 33A and 33B in locked or wheel-engaging positions. When the hydraulic lift cylinder 85 is extended and the main boom 21 is in a lowered or loading position, the actuating bar 84 depresses the limit switch 83 which permits actuation of the linear actuators 41A and 41B. The linear actuators 41A and 41B are then operable and the gripping arm segments 33A and 33B may be freely opened and closed as described above.

Figure 17:
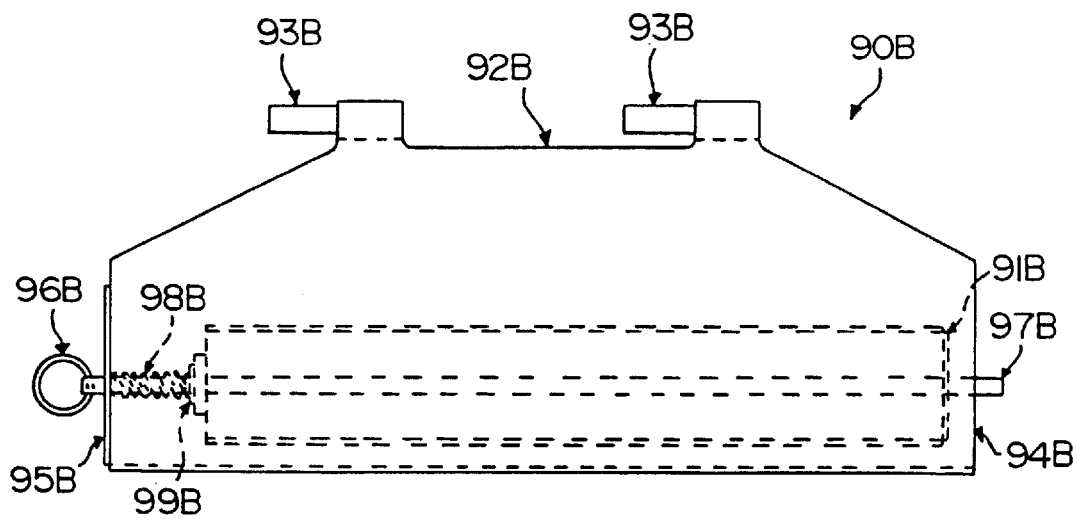
FIG. 17 is a detailed top view of a left wheel spacer.
Figure 18:
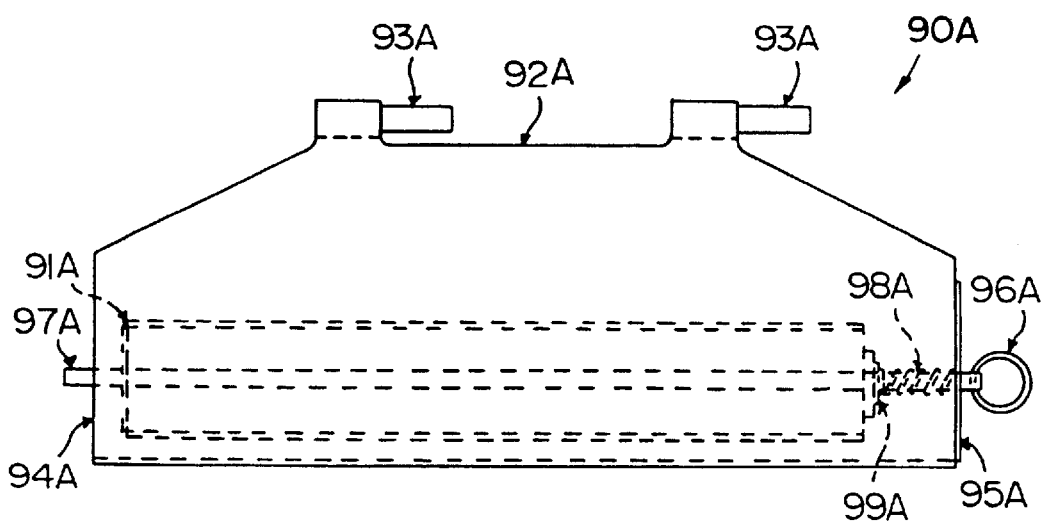
FIG. 18 is a detailed top view of a right wheel spacer.

In yet another embodiment, the present invention provides wheel spacers 90A and 90B, as depicted in FIGS. 17 and 18 (FIG. 17 illustrates a left wheel spacer 90B and FIG. 18 illustrates a right wheel spacer 90A). The wheel spacers 90A and 90B comprise wheel engaging surfaces 91A and 91B and top edges 92A and 92B, respectively. Attached to the top edges 92A and 92B, the wheel spacers 90A and 90B each contain two pins 93A and 93B extending parallel to the top edges 92A and 92B. The pins 93B on the left wheel spacer 90B extend toward the left and the pins 93A on the right wheel spacer 90A extend toward the right as shown in FIGS. 17 and 18, respectively.

The wheel spacers further comprise right edges 94A and 94B and left edges 95A and 95B. Spring loaded latching pins 97A and 97B extend through both the right and left edges 94A and 94B, and 95A and 95B, respectively, and include gripping means 96A and 96B at one end. The latching pins 97A and 97B protrude beyond both the left and right edges, 94A and 94B, and 95A and 95B, respectively. The gripping means 96B is located at the end of the latching pin 97B protruding through the left edge 95B, and the gripping means 96A is located at the end of the latching pin 97A protruding through the right edge 95A. The latching pins also include springs 98A and 98B, located just inside the left edge 95B and just inside the right edge 94A, respectively. The springs 98A and 98B are locked in place with locking rings 99A and 99B with spring tension forcing the latching pin 97B toward the right and forcing the latching pin 97A toward the left.

Figure 19:
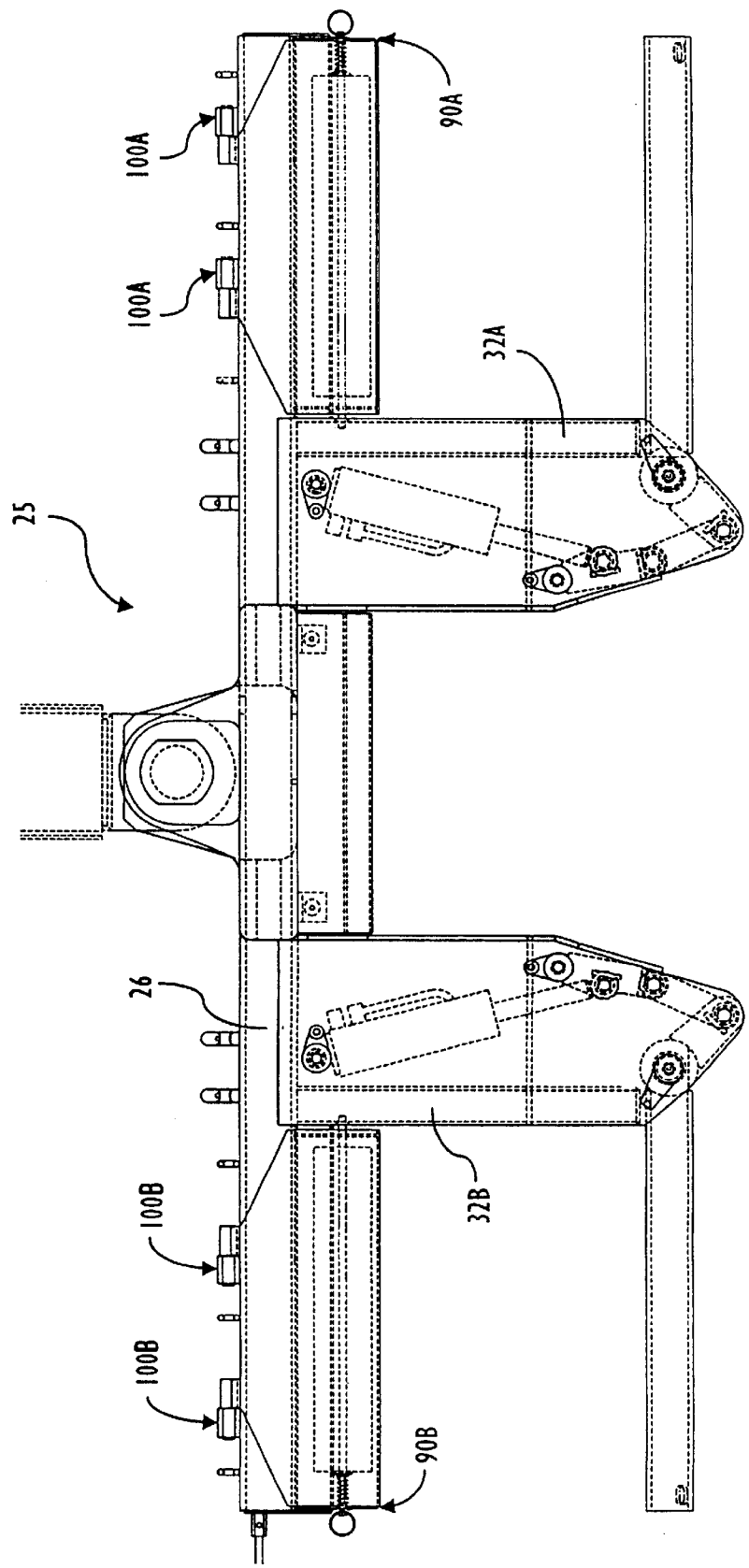
FIG. 19 is a detailed top view of the wheel grid with wheel spacers in place.

Referring now to FIG. 19, the wheel spacers 90A and 90B slip in place by inserting the pins 93A and 93B into the slot rings 100A and 100B on the rear edge of the wheel boom 26. The wheel spacers rotate downward into place and the protruding end of the spring loaded latching pins 97A and 97B, without the gripping means 96A and 96B, extend through a hole in the extension arm segments 32A and 32B, and latch the wheel spacers 90A and 90B in place. The spring loaded latching pins 97A and 97B merely latch the wheel spacers 90A and 90B in place, while the top surface of the wheel boom 26 provides the main support for the wheel spacers 90A and 90B.

Of course, it should be understood that a wide range of changes and modifications can be made to the preferred embodiments described above. It is therefore intended that the foregoing detailed description be regarded as illustrative rather than limiting and that it be understood that it is the following claims, including all equivalents, which are intended to define the scope of this invention.

What is claimed is:

1. A wheel-grid assembly comprising:
   a wheel boom;
   a pair of lift arms each having an extension arm segment and an engaging arm segment, with said extension arm segments being relatively transversely attached to the wheel boom at positions disposed to fit between front or rear wheels of a vehicle to be towed, and with each engaging arm segment pivotally attached to a respective extension arm segment; and
   a pair of linear actuators each having a fixed arm segment and a movable arm segment, with each fixed arm segment pivotally attached to the wheel boom in a relatively transverse position, and with each movable arm segment pivotally attached to an over-center locking mechanism, and with each over-center locking mechanism attached to a respective engaging arm segment;
   wherein each over-center locking mechanism locks the respective engaging arm segment in a wheel engaging position for engaging a front or rear wheel of the vehicle to be towed without aid of force from the linear actuator;
   wherein said wheel boom and said extension arm segments are situated in a plane, and said engaging arm segments are positioned at an upward angle with respect to said plane, and
   wherein each over-center locking mechanism includes a first segment pivotally connected to a respective movable arm segment, and a second segment having one end pivotally connected to the first segment and another end pivotally connected to said respective engaging arm segment,
   whereby movement of the respective movable arm segment moves said first segment and said second segment of said over-center, locking mechanism, and movement of said second segment of said over-center locking mechanism pivots said engagement arm between said wheel engaging position and an open position.

2. The wheel grid assembly of claim 1, wherein the upward angle approximately ranges from 1°–5°.

3. The wheel grid assembly of claim 1, wherein the upward angle is approximately 2°.

4. A wheel-grid assembly comprising:
   a wheel boom;
   a pair of lift arms each having an extension arm segment and an engaging arm segment, with said extension arm segments being relatively transversely attached to the wheel boom at positions disposed to fit between front or rear wheels of a vehicle to be towed, and with each engaging arm segment pivotally attached to a respective extension arm segment; and
   a pair of linear actuators each having a fixed arm segment and movable arm segment, with each fixed arm segment pivotally attached to the wheel boom in a relatively transverse position, and with each movable arm segment pivotally attached to an over-center locking mechanism, and with each over-center locking mechanism attached to a respective engaging arm segment;
   wherein each over-center locking mechanism comprises a means for preventing the over-center locking mechanism from reaching an over-center locking position while the respective engaging arm segment is in an open position;
   wherein each over-center locking mechanism locks the respective engaging arm segment in a wheel engaging position for engaging a front or rear wheel of the vehicle to be towed without aid of force from the linear actuator, and
   wherein each over-center locking mechanism includes a first segment pivotally connected to a respective movable arm segment, and a second segment having one end pivotally connected to the first segment and another end pivotally connected to said respective engaging arm segment,
   whereby movement of the respective movable arm segment moves said first segment and said second segment of said over-center locking mechanism, and movement of said second segment of said over-center locking mechanism pivots said engagement arm between said wheel engaging position and said open position.

5. The wheel grid assembly of claim 4, wherein full extension of the movable arm segment positions the first and second segments in a locking position whereby outward pressure against the respective engaging arm segment forces the first and second segments in the direction of the locking position.

6. The wheel grid assembly of claim 4, wherein the means for preventing the over-center locking mechanism from reaching an over-center locking position while the respective engaging arm segment is in an open position comprises a lobe located on each second segment at the end attached to the respective engaging arm segment.

7. The wheel grid assembly of claim 4, wherein said wheel boom and said extension arm segments are situated in a plane, and said engaging arm segments are positioned at an upward angle with respect to said plane.

8. The wheel grid assembly of claim 7, wherein said upward angle approximately ranges from 1°–5°.

9. The wheel grid assembly of claim 7, wherein said upward angle is approximately 2°.

10. A tow assembly for lifting a vehicle's front or rear end, comprising:
- a telescopic boom connected to said tow assembly;
- a wheel grid assembly pivotally connected to said telescopic boom, said wheel grid assembly comprising:
- a pair of lift arms each having an extension arm segment and an engaging arm segment, with said extension arm segments being relatively transversely attached to the wheel boom at positions disposed to fit between front or rear wheels of a vehicle to be towed, and with each engaging arm segment pivotally attached to a respective extension arm segment; and
- a pair of linear actuators each having a fixed arm segment and movable arm segment, with each fixed arm segment pivotally attached to the wheel boom in a relatively transverse position, and with each movable arm segment pivotally attached to an over-center locking mechanism, and with each over-center locking mechanism attached to a respective engaging arm segment;
- wherein each over-center locking mechanism comprises a means for preventing the over-center locking mechanism from reaching an over-center locking position while the respective engaging arm segment is in an open position;
- wherein each over-center locking mechanism locks the respective engaging arm segment in a wheel engaging position for engaging a front or rear wheel of the vehicle to be towed without aid of force from the linear actuator, and
- wherein each over-center locking mechanism includes a first segment pivotally connected to a respective movable arm segment, and a second segment having one end pivotally connected to the first segment and another end pivotally connected to said respective engaging arm segment,
- whereby movement of the respective movable arm segment moves said first segment and said second segment of said over-center locking mechanism, and movement of said second segment of said over-center locking mechanism pivots said engagement arm between said wheel engaging position and said open position.

11. The tow assembly of claim 10, wherein said wheel boom and said extension arm segments are situated in a plane, and said engaging arm segments are positioned at an upward angle with respect to said plane.

12. The tow assembly of claim 11, wherein said upward angle approximately ranges from 1°–5°.

13. The tow assembly of claim 11, wherein said upward angle is approximately 2°.

14. A tow truck for lifting a vehicle's front or rear end, and for transporting said vehicle, comprising:
- a tow truck chassis including a bed frame and a deck situated above said bed frame;
- a tow assembly connected to said truck chassis for lifting a vehicle's front or rear end by its front or rear wheels, said tow assembly comprising:
- a telescopic boom connected to said tow assembly;
- a wheel grid assembly pivotally connected to said telescopic boom, said wheel grid comprising:
- a pair of lift arms each having an extension arm segment and an engaging arm segment, with said extension arm segments being relatively transversely attached to the wheel boom at positions disposed to fit between front or rear wheels of a vehicle to be towed, and with each engaging arm segment pivotally attached to a respective extension arm segment; and
- a pair of linear actuators each having a fixed arm segment and movable arm segment, with each fixed arm segment pivotally attached to the wheel boom in a relatively transverse position, and with each movable arm segment pivotally attached to an over-center locking mechanism, and with each over-center locking mechanism attached to a respective engaging arm segment;
- wherein each over-center locking mechanism comprises a means for preventing the over-center locking mechanism from reaching an over-center locking position while the respective engaging arm segment is in an open position;
- wherein each over-center locking mechanism locks the respective engaging arm segment in a wheel engaging position for engaging a front or rear wheel of the vehicle to be towed without aid of force from the linear actuator, and
- wherein each over-center locking mechanism includes a first segment pivotally connected to a respective movable arm segment, and a second segment having one end pivotally connected to the first segment and another end pivotally connected to said respective engaging arm segment,
- whereby movement of the respective movable arm segment moves said first segment and said second segment of said over-center locking mechanism, and movement of said second segment of said over-center locking mechanism pivots said engagement arm between said wheel engaging position and said open position.

15. The tow truck of claim 14, wherein said wheel boom and said extension arm segments are situated in a plane, and said engaging arm segments are positioned at an upward angle with respect to said plane.

16. The tow truck of claim 15, wherein said upward angle approximately ranges from 1°–5°.

17. The tow truck of claim 15, wherein said upward angle is approximately 2°.

18. A wheel engaging apparatus comprising:
- a support frame;
- at least one actuator having one end connected to said support frame;
- at least one wheel engaging arm which engages with at least one wheel of a vehicle; and
- at least one over-center locking mechanism being connected to said at least one wheel engaging arm and another end of said at least one actuator,
- wherein said at least one over-center locking mechanism locks said at least one wheel engaging arm in an engagement position with said at least one wheel, and
- wherein said at least one over-center locking mechanism includes a first segment pivotally connected to said other end of said at least one actuator, and a second segment having one end pivotally connected to the first segment and another end pivotally connected to said at least one wheel engagement arm,
- whereby movement of said at least one actuator moves said first segment and said second segment of said over-center locking mechanism, and movement of said second segment of said over-center locking mechanism pivots said at least one wheel engagement arm between an engagement position and a disengagement position.

19. The wheel engaging apparatus of claim 18, wherein when said at least one over-center locking mechanism is in a locked position, the at least one wheel engaging arm is locked in the engaged position without an applied force from said actuator.

20. The wheel engaging apparatus of claim 18, wherein said at least one over-center locking mechanism includes a structure which prevents said at least one over-center locking mechanism from locking the at least one wheel engagement arm until the at least one wheel engagement arm is in the engagement position.

21. The wheel engaging apparatus of claim 20, wherein said structure includes a lobe on a portion of the at least one over-center locking mechanism.

22. The wheel engaging apparatus of claim 18, wherein said at least one wheel engagement arm includes two engagement arms, said at least one actuator includes two actuators, and said at least one over-center locking mechanism includes two over-center locking mechanisms, each over-center locking mechanism and each actuator corresponding to an engagement arm.

23. A wheel-grid assembly comprising:
- a pair of extension arm segments being operable to engage a wheel boom, said extension arm segments being operable to be relatively transversely attached to the wheel boom at positions disposed to fit between front or rear wheels of a vehicle to be towed;
- an engaging arm segment associated with each extension arm segment, each engaging arm segment being operable to engage said associated extension arm segment so that it is pivotally attached to said associated extension arm segment;
- an over-center locking mechanism associated with each engagement arm segment, each over-center locking mechanism being operable to be pivotally attached to said associated engaging arm segment; and
- a linear actuator associated with each over-center locking mechanism, each linear actuator having a fixed arm segment and a movable arm segment, each fixed arm segment being operable to be pivotally attached to the wheel boom in a relatively transverse position, and each movable arm segment being operable to be pivotally attached to said associated over-center locking mechanism, and
- wherein each over-center locking mechanism is operable to lock the respective engaging arm segment in a wheel engaging position for engaging a front or rear wheel of the vehicle to be towed without aid of force from the linear actuator;
- wherein said extension arm segments are configured to engage said wheel boom such that said extension arm segments and said wheel boom are situated in a plane, and said engaging arm segments are configured to engage said extension arm segments such that the engaging arm segments are positioned at an upward angle with respect to said plane, and
- wherein each over-center locking mechanism includes a first segment which is operable to be pivotally connected to said associated movable arm segment, and a second segment having one end pivotally connected to the first segment and another end being operable to be pivotally connected to said associated engaging arm segment,
- whereby said engagement arms are configured to be pivoted between a wheel engaging position and an open position by movement of the associated movable arm segment moving said first segment and said second segment of said over-center locking mechanism, and said second segment of said over-center locking mechanism pivoting said associated engagement arm.

24. A vehicle for lifting another vehicle's front or rear end, and for transporting said vehicle, comprising:
- a support structure which supports moving components of said vehicle and a body of said other vehicle;
- a tow assembly connected to said support structure for lifting the other vehicle's front or rear end, said tow assembly comprising:
  - a telescopic boom connected to said tow assembly;
  - a wheel grid assembly pivotally connected to said telescopic boom, said wheel grid comprising:
    - a pair of lift arms, each having an extension arm segment and an engaging arm segment, said extension arm segments being relatively transversely attached to the wheel boom at positions disposed to fit between front or rear wheels of said other vehicle to be towed, and each engaging arm segment being pivotally attached to a respective extension arm segment; and
    - a pair of linear actuators, each having a fixed arm segment and movable arm segment, each fixed arm segment being pivotally attached to the wheel boom in a relatively transverse position, each movable arm segment being pivotally attached to an over-center locking mechanism, and each over-center locking mechanism being attached to a respective engaging arm segment;
  - wherein each over-center locking mechanism comprises a means for preventing the over-center locking mechanism from reaching an over-center locking position while the respective engaging arm segment is in an open position;
  - wherein each over-center locking mechanism locks the respective engaging arm segment in a wheel engaging position for engaging a front or rear wheel of said other vehicle to be towed without aid of force from the linear actuator, and
  - wherein each over-center locking mechanism includes a first segment pivotally connected to a respective movable arm segment, and a second segment having one end pivotally connected to the first segment and another end pivotally connected to said respective engaging arm segment,
  - whereby movement of the respective movable arm segment moves said first segment and said second segment of said over-center locking mechanism, and movement of said second segment of said over-center locking mechanism pivots said engagement arm between said wheel engaging position and said open position.

* * * * *